(12) United States Patent
Drumm et al.

(10) Patent No.: US 8,449,047 B2
(45) Date of Patent: May 28, 2013

(54) BRAKING SYSTEM FOR MOTOR VEHICLES

(75) Inventors: Stefan A. Drumm, Saulheim (DE); Lothar Schiel, Hofheim (DE)

(73) Assignee: Continental Teves AG & Co. oHG (DE)

( * ) Notice: Subject to any disclaimer, the term of this patent is extended or adjusted under 35 U.S.C. 154(b) by 550 days.

(21) Appl. No.: 12/595,990

(22) PCT Filed: Mar. 19, 2008

(86) PCT No.: PCT/EP2008/053334
§ 371 (c)(1),
(2), (4) Date: Mar. 31, 2010

(87) PCT Pub. No.: WO2008/128835
PCT Pub. Date: Oct. 30, 2008

(65) Prior Publication Data
US 2010/0181825 A1   Jul. 22, 2010

(30) Foreign Application Priority Data

Apr. 19, 2007   (DE) .......................... 10 2007 018 895
Oct. 17, 2007   (DE) .......................... 10 2007 049 620

(51) Int. Cl.
*B60T 8/42*   (2006.01)

(52) U.S. Cl.
USPC ........ 303/115.4; 303/114.1; 60/553; 188/358

(58) Field of Classification Search
USPC .......... 303/113.4, 115.4, 114.1, 116.1, 119.1, 303/113.2, 113.3, 114.2, 115.1; 188/358; 60/579, 580, 552, 595, 593, 547.1, 553
See application file for complete search history.

(56) References Cited

U.S. PATENT DOCUMENTS

| | | | |
|---|---|---|---|
| 6,641,231 B2* | 11/2003 | Kusano et al. | 303/114.1 |
| 7,168,771 B2* | 1/2007 | Nakano | 303/191 |
| 8,061,786 B2* | 11/2011 | Drumm et al. | 303/115.4 |
| 2004/0061375 A1 | 4/2004 | Drott et al. | |
| 2006/0220451 A1* | 10/2006 | Drumm | 303/114.1 |
| 2008/0236971 A1* | 10/2008 | Suzuki et al. | 188/358 |
| 2008/0257670 A1 | 10/2008 | Drumm et al. | |
| 2008/0258545 A1* | 10/2008 | Drumm | 303/114.1 |
| 2008/0258546 A1 | 10/2008 | Drumm et al. | |

FOREIGN PATENT DOCUMENTS

| | | |
|---|---|---|
| DE | 30 28 894 A1 | 2/1982 |
| DE | 102 58 266 A1 | 7/2004 |
| DE | 10 2004 025 638 A1 | 9/2005 |
| EP | 1 078 833 A2 | 2/2001 |

(Continued)

*Primary Examiner* — Thomas Irvin
(74) *Attorney, Agent, or Firm* — RatnerPrestia

(57) ABSTRACT

A brake system with a master cylinder, a first piston which is coupled to a brake pedal via a push rod transmitting actuating forces, a second piston which can be actuated by the first piston and which can be brought into force-transmitting connection to a third piston, via which the master cylinder is actuated, at least one elastic element which forms a pedal travel simulator which, in the "brake-by-wire" operating mode, gives the vehicle driver a pleasant pedal sensation, an interspace capable of being acted upon with hydraulic pressure, between the second and the third piston, the action of pressure upon the interspace loading the second and the third piston in opposite directions, a pressure supply device which has a high-pressure source and which allows both a filling of the interspace with pressure medium and emptying thereof, and a valve device for varying pressure fed in the interspace.

20 Claims, 3 Drawing Sheets

FOREIGN PATENT DOCUMENTS

| WO | WO 01/72567 | A1 | 10/2001 |
| WO | WO 02/064409 | A2 | 8/2002 |
| WO | WO 2006/042823 | A1 | 4/2006 |
| WO | WO 2007/031398 | A1 | 3/2007 |

* cited by examiner

US 8,449,047 B2

BRAKING SYSTEM FOR MOTOR VEHICLES

CROSS REFERENCE TO RELATED APPLICATIONS

This application is the U.S. national phase application of PCT International Application No. PCT/EP2008/053334, filed Mar. 19, 2008, which claims priority of German Patent Application No. 10 2007 018 895.3, filed Apr. 19, 2007 and German Patent Application No. 10 2007 049 620.8, filed Oct. 17, 2007, the contents of such applications being incorporated by reference herein.

BACKGROUND OF THE INVENTION

1. Field of the Invention

The invention relates to a brake system for motor vehicles, with a master cylinder to which wheel brake cylinders are connectable, with a first piston which is coupled to a brake pedal via a push rod transmitting actuating forces, with a second piston which actuates the master cylinder, with a third piston which can be actuated by the first piston and which can be brought into force-transmitting connection to the second piston, with at least one elastic element which forms a pedal travel simulator which, in the "brake-by-wire" operating mode, gives the vehicle driver a pleasant pedal sensation, with means for coupling the movements of the first and of the third piston, with an interspace, capable of being acted upon with hydraulic pressure, between the second and the third piston, the action of pressure upon the interspace loading the second and the third piston in opposite directions, with an electrically controllable pressure supply module which allows both a filling of the interspace with pressure medium and the emptying thereof, and with a valve device, by means of which the pressure fed in the interspace can be varied.

2. Description of the Related Art

In motor vehicle technology, "brake-by-wire" brake systems are in increasingly widespread use. In these brake systems, the brake can be "extraneously" actuated, even without the active assistance of the driver, by means of electronic signals. These electronic signals may be output, for example, by an electronic stability program ESP or a headway control system ACC. If there is an overlap of an extraneous actuation of this type with a driver actuation, the driver of the motor vehicle detects a reaction in the brake pedal. This reaction effect on the brake pedal may be surprising and unpleasant to the driver, and therefore, in a critical road traffic situation, the driver does not actuate the brake pedal to an extent matched to this situation, since he is irritated by the reaction on the brake pedal caused by the extraneous actuation of the brake.

A brake system of the generic type initially mentioned is known from international patent application WO 2006/042823 A1. In order to make it possible to assist the actuating force even in the event of a failure of the control electronics or of the electrical energy supply, the known brake system has arranged between the first and the third piston a fourth piston which, in interaction with the third piston, delimits a hydraulic chamber which has a hydraulic connection, capable of being shut off as a result of brake pedal actuation, to a pressure medium reservoir, and in which pressure can be built up by means of the actuating forces, a valve arrangement being activatable by the hydraulic pressure fed in the chamber, and the pressure fed in the interspace being variable by means of said valve arrangement. It is found to be a disadvantage of the known brake system that the pedal travel simulator is switched off as a function of the movement travel of the third piston which constitutes a loss of travel during actuation.

SUMMARY OF THE INVENTION

An object of the present invention, therefore, is to propose a brake system of the generic type initially mentioned, in which the pedal travel simulator is switched off and switched on, without detectable losses of travel occurring during actuation on the brake pedal.

This object is achieved, according to aspects of the invention, in that the means for coupling the movements of the first and of the second piston are automatically active in the event of an absent pressure supply and can be deactivated by the hydraulic pressure provided by the pressure supply device.

To put the idea of the invention into more concrete terms, in an advantageous development of the subject of the invention at least one further (fourth) piston is provided, which can be acted upon with the hydraulic pressure provided by the pressure supply device and which allows a movement of the first piston with the effect of the actuation of the pedal travel simulator or prevents such a movement.

The present invention is explained in more detail below by means of two exemplary embodiments, with reference to the accompanying diagrammatic drawing in which identical components are given the same reference symbols.

DETAILED DESCRIPTION OF THE PREFERRED EMBODIMENTS

Figure 1:
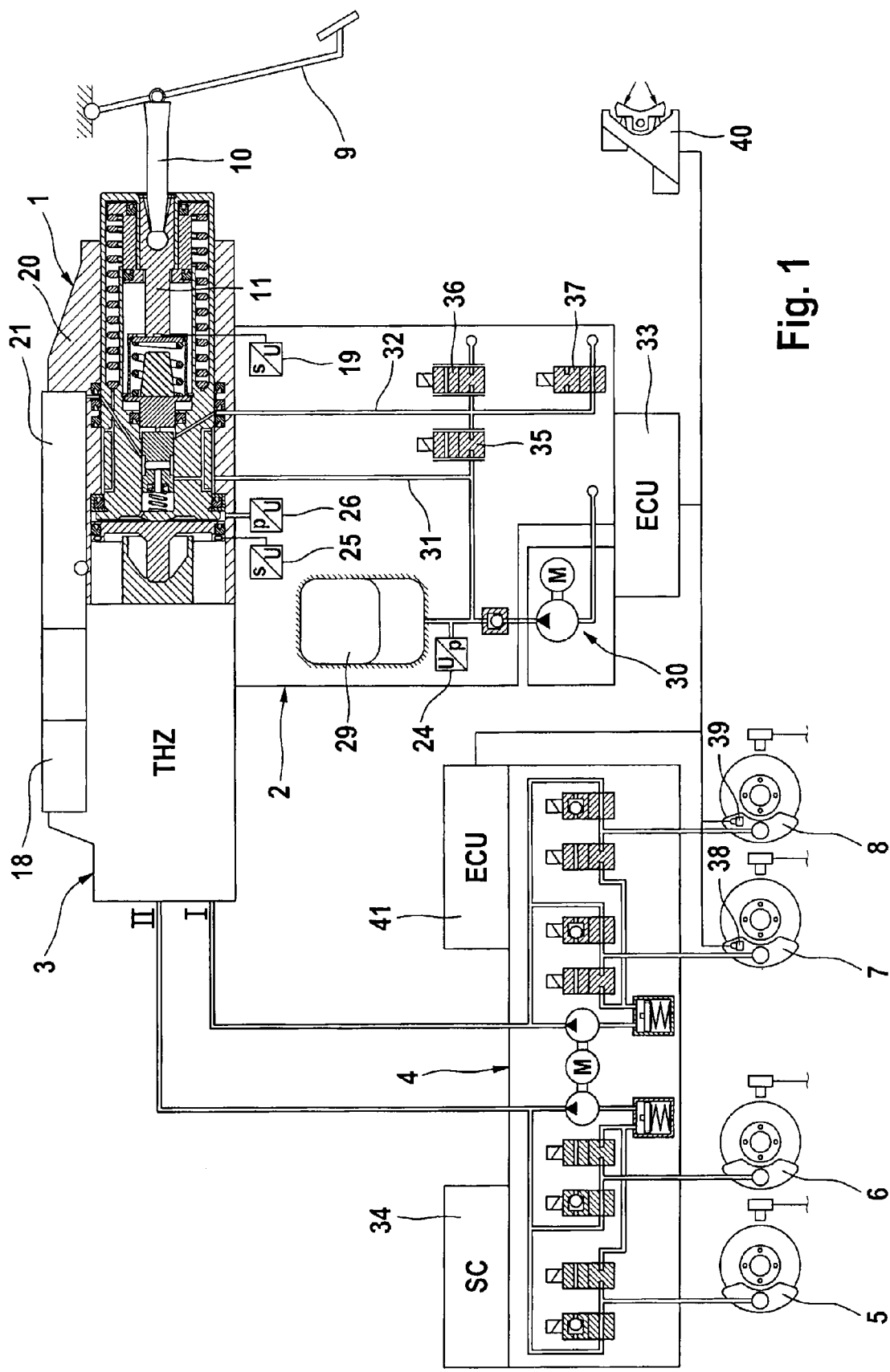
FIG. 1 shows the set-up of a first version of the brake system according to an exemplary embodiment of the invention.

The brake system according to aspects of the invention, illustrated in the drawing, consists essentially of an actuation device 1, of a pressure supply device 2, the actuation unit and the pressure supply device forming a brake booster, and of a brake master cylinder or a tandem master cylinder 3 which operatively follows the brake booster and of which the pressure spaces, not illustrated, can be connected to the chambers of a first pressure medium reservoir 18 which are under atmospheric pressure. On the other hand, the pressure spaces have connected to them wheel brake circuits I, II which, with a known ABS or ESP hydraulic assembly or an electrically controllable wheel brake pressure modulation module 4 being interposed, supply the wheel brakes 5-8 of a motor vehicle with hydraulic pressure medium. The wheel brakes 7, 8 are preferably equipped with electrical actuation elements 38, 39 which can be activated by means of a parking brake switch 40 and by means of which a parking brake function can be implemented. A sensor cluster 34, indicated merely diagrammatically, which contains a transverse acceleration sensor, not shown, and a yaw rate sensor, serves, in combination with the abovementioned wheel brake pressure modulation module 4, for implementing an electronic stability function (ESP). The wheel brake pressure modulation module 4 is assigned an electronic control and regulation unit 41. The actuation device 1, which is arranged in a housing 20 to which the tandem master cylinder 3 is connected, can be activated via a brake pedal 9 which is coupled mechanically via an actuating rod 10 to a first piston 11 of the actuation device 1. The actuating travel of the brake pedal 9 is detected by means of a travel sensor 19 which senses the travel of the first piston 11. However, a rotary angle sensor which detects the rotary angle of the brake pedal 9 may also be used for the same purpose.

The abovementioned pressure supply device 2 comprises a hydraulic high-pressure source 30 designed as a motor/pump assembly, optionally a high-pressure accumulator 29, pressure-regulating valves 35, 36, 37 and a second pressure medium reservoir 21 which may be arranged, for example, on the housing 20 of the actuation unit 1 and which preferably forms with the first pressure medium reservoir 18 a structural unit. A pressure sensor 24, which may likewise be integrated in the pressure supply device 2, serves for monitoring the pressure discharged by the high-pressure source 30. The high-pressure accumulator 29 delivers the energy for brake actuation when the motor/pump assembly of the high-pressure source 30, because of the mass inertia of its rotor, cannot immediately provide the pumping power necessary, for example, for sudden full braking, or when there is no electrical energy available for driving the motor/pump assembly. The pressure supply device 2 is assigned an electronic control unit 33 which is fed, inter alia, with output signals from the travel sensor 19 and the pressure sensor 24 and which serves for activating the motor/pump assembly 30 and the pressure-regulating valves 35-37. The high-pressure source 30 is connected to the actuation unit 1 by means of a hydraulic line which is given the reference symbol 31, while the line portion between the pressure-regulating valves 35, 36 is likewise connected to the actuation unit 1 by means of a further hydraulic line 32. The function of the two lines 31, 32 is explained in more detail in the following description.

Figure 2:
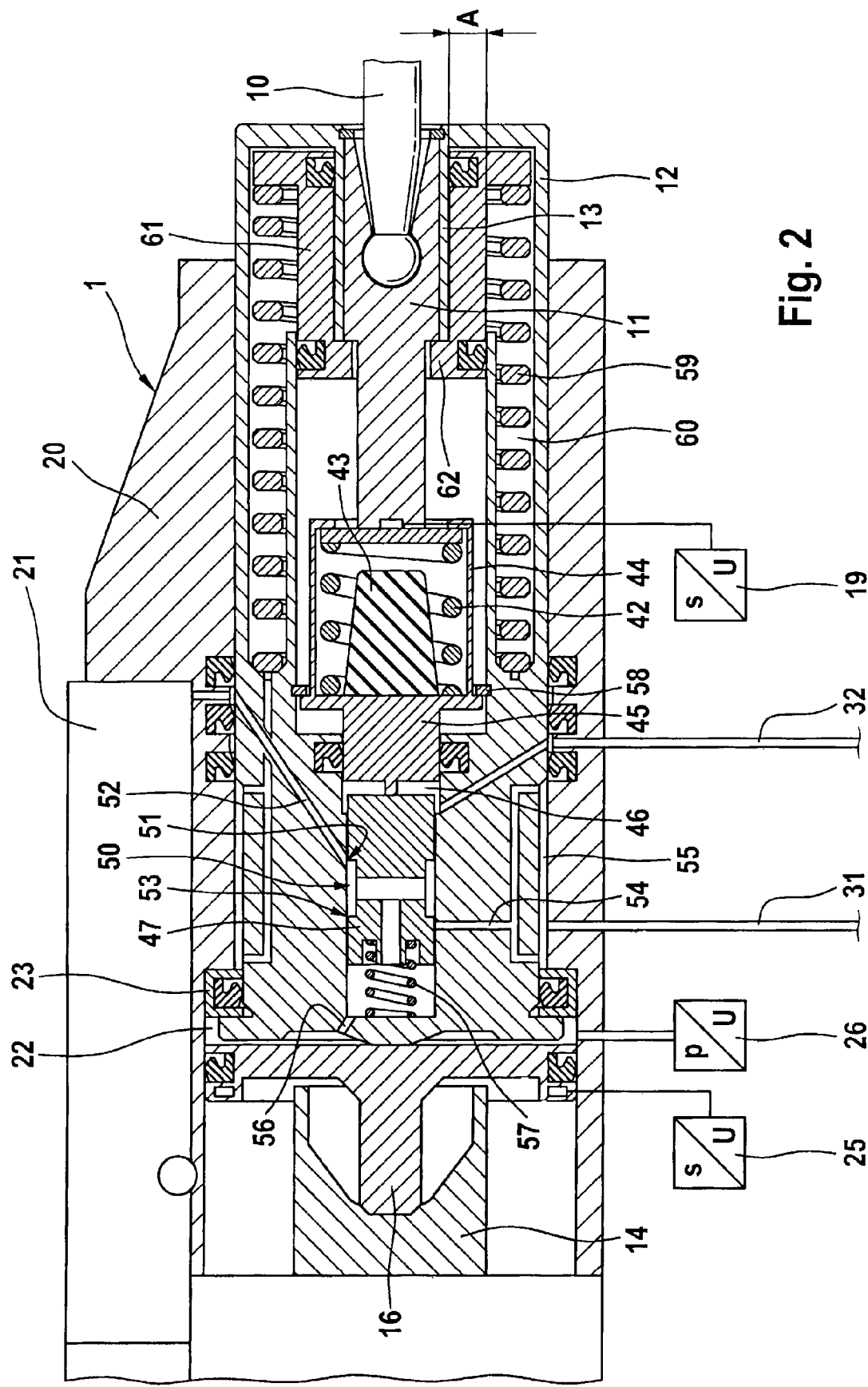
FIG. 2 shows the actuation device according to FIG. 1 on an enlarged scale.

As may be gathered particularly from FIG. 2, the first piston 11 is guided displaceably in a guide 13 of a second piston 12 which cooperates with a third piston 14 which may form the primary piston of the tandem master cylinder 3, in the example illustrated a pressure intensification piston 16 being arranged between the second 12 and the third 14 piston. Between the second piston 12 and the pressure intensification piston 16, an interspace 22 is delimited, as a result of the action upon which with a hydraulic pressure the second piston 12 is held against a stop 23 formed in the housing 20, while the pressure intensification piston 16 and consequently the primary piston 14 of the tandem master cylinder are acted upon with the effect of a pressure build-up in the tandem master cylinder 3. A movement of the pressure intensification piston 16 which results from this load is detected by means of a second travel sensor 25. The pressure fed in the interspace 22 is detected by means of a second pressure sensor 26. An elastic element or a compression spring 42 is arranged operatively between the first piston 11 and a force transmission element 45 and, together with an elastomeric spring 43, forms a pedal travel simulator which, when the brake system is actuated, gives the vehicle driver the accustomed pedal sensation which corresponds to a usual brake pedal characteristic. This means that the resistance rises slowly in the case of a small brake pedal travel and increases superproportionally in the case of a greater brake pedal travel.

For mechanical guidance of the elastic element 42, that end of the force transmission element 45 which faces the pedal is designed as a hollow cylinder 44. The force transmission element 45 is displaceably guided, sealed off, in the second piston 12 and delimits therein a pilot control chamber 46, to which the pressure-regulating valves 35-37 are connected via the abovementioned hydraulic line 32, so that said pilot control chamber can be fed with a pilot control pressure which is set by the suitable activation of the pressure-regulating valves 35-37. On the other hand, the pilot control chamber 46 is delimited by a valve body 47 of a pressure-regulating valve device 50 which is designed as a slide valve and with the aid of which the pressure fed in the interspace 22 can be varied. A first control edge 51 of the slide valve body 47 in this case cooperates with the issue of a pressure medium duct 52 which is formed in the second piston 12 and which allows the inner space of the valve body 47 to be connected to the pressure medium reservoir 21. By contrast, a second control edge 53 of the valve body 47 cooperates with the issue of a further pressure medium duct 54 which is formed in the second piston 12 and which is connected to an annular space 55 which is delimited by the second piston 12 in the housing 20 and into which the abovementioned hydraulic line 31 issues. A further pressure medium duct 56 connects the inner space of the valve body 47 to the interspace 22. In the position of rest of the valve body 47, as shown in the drawing, the latter bears under the prestress of a valve spring 57 against the force transmission element 45 which is supported on a stop 58 provided in the second piston 12.

Moreover, it can be gathered from FIG. 2 that, in the second piston 12, a hydraulic space 60 is provided which is connected to the abovementioned annular space 55 and which receives a compression spring 59 of relatively high rating which is supported on a fourth piston 61, arranged displaceably coaxially to the guide 13, and which holds said piston in bearing contact against the end of the guide 13. A radial collar 62, on which the first piston 11 is supported axially, serves for the bearing of the fourth piston 61, so that, as a result of the action of the strong spring 59, a movement of the first piston 11 with the effect of the actuation of the pedal travel simulator 42, 43 is prevented.

In a first (normal) operating mode, that is to say in a hydraulic booster operating mode, if the brake system is functioning perfectly the annular surface, designated by "A", of the fourth piston 61 is acted upon with the high pressure provided by the high-pressure source 30, so that the fourth piston 61 moves to the left in the drawing and releases the first piston 11, so that the pedal travel simulator 42, 43 is actuated and the driver is given the usual pedal sensation. By means of a corresponding activation of the pressure-regulating valves 35-37, the pilot control chamber 46 is acted upon with a pilot control pressure, so that, as a result of a subsequent displacement of the valve body 47, the pressure medium duct 52 leading to the pressure medium reservoir 21 is shut off and the pressure medium duct 54 is released, so that the interspace 22 is acted upon with a regulated high pressure. As a result of the action of the high pressure, the second piston 12 is held against the abovementioned stop 23 and the pressure intensification piston 16 is displaced in the direction of actuation of the brake master cylinder 3. The pressure in the interspace 22 is otherwise freely selectable, so that any desired dependence of the brake pressure on the brake pedal actuation can be programmed. Undesirable pedal reactions are in this case ruled out. This electronic actuation pressure regulation has the advantage that its transmission behavior can be selected freely within the framework of the dynamics afforded by the technical data of the pressure accumulator and pressure-regulating valves. Consequently, a jumper function, as it may be referred to, that is to say the jump to a predetermined brake pressure value when the brake pedal 9 is touched, a brake assistance function, deceleration control and autonomous braking, such as is required, for example, for ASR (traction control), ESP (electronic stability program) and ACC (adaptive cruise control), can be implemented by means of software measures. For this purpose, the driver's instruction in the form of a brake pedal actuation, detected by travel, force or other sensors, is converted by a computing unit, not explicitly illustrated, using suitable algorithms, into wheel brake pressures which are implemented with the aid of the electronically switchable valves in the pressure supply device 2 and the following ABS/ESP control module 4.

In a second operating mode, which corresponds to an occurrence of a mechanical and/or electrical fault, causing a malfunction of the pressure-regulating valves 35-37, and therefore to a first relapse level, no pilot control pressure can be fed in the pilot control chamber 46. In this case, the pressure-regulating valve device 50 is actuated by means of a transmission of the actuating force introduced at the brake pedal 9 to the force transmission element 44, so that the interspace 22 is acted upon with a regulated high pressure, as in the case described above.

In a third operating mode which is characterized by the absence of a pressure generated by the hydraulic pressure supply device 2 or by a failure of the high-pressure source 29 or 30, and in which no high pressure is made available and which corresponds to a second relapse level, a pressure build-up takes place in the brake master cylinder 3 as a result of purely mechanical force transmission between the first (11) or the second 12 piston and the pressure intensification piston 16 or the third piston 14, during which the abovementioned strong spring 59 is compressed by the actuating force.

Figure 3:
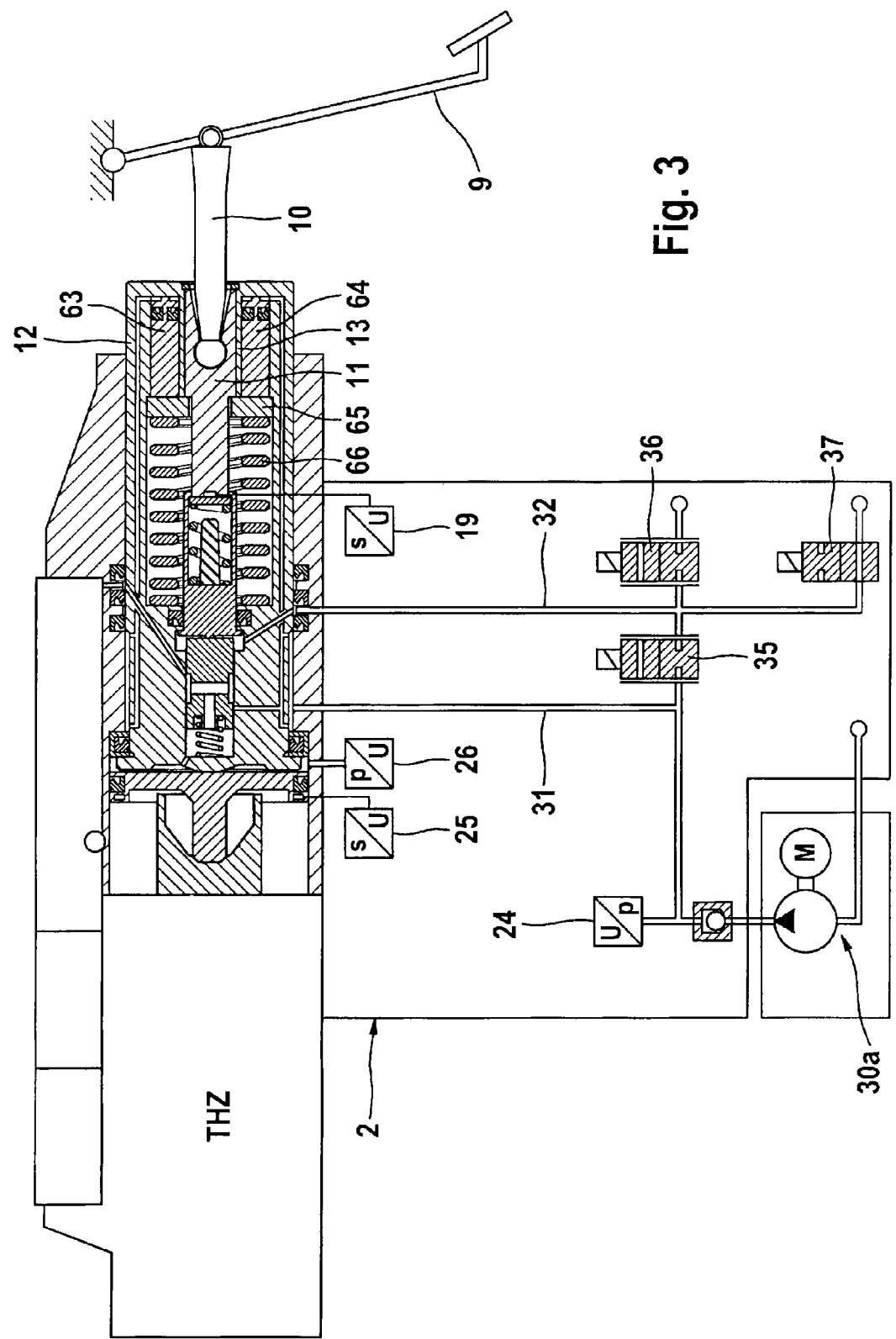
FIG. 3 shows the set-up of a second version of the brake system according to another exemplary embodiment of the invention.

The set-up of the second embodiment, illustrated in FIG. 3, of the brake system according to aspects of the invention corresponds largely to the first version shown in FIG. 1. A motor/pump assembly 30a is used as high-pressure source. A further difference can be seen in the design of the means for coupling the movements of the first (11) and of the second (12) piston, which means are formed by a plurality of pistons 63, 64 arranged at regular angular intervals around the abovementioned guide 13 of the second piston 12, and by an annular force transmission disk 65 cooperating with the pistons 63, 64. The force transmission disk 65 is prestressed counter to the direction of actuation of the first piston 11 via a compression spring 66 and under the prestress of this compression spring 66 bears axially against the pistons 63, 64 and also the guide 13 and the first piston 11. In the exemplary embodiment illustrated, the compression spring 66 is arranged in the dry inner space of the second piston 12. The release of the first piston 11 takes place, in a similar way to the first version, by the pistons 63, 64 being acted upon with the pressure provided by the high-pressure source 30a, thus resulting in a movement of the pistons 63, 64 and therefore of the force transmission disk 65 to the left in the drawing.

By virtue of the present invention, a brake system of simple set-up is achieved in which the brake pedal characteristic is not dependent on the state of actuation of the remaining brake system, with the result that, in the event of braking by the driver, the pedal sensation cannot be disturbed either by the simultaneous presence of extraneous braking or by other control activities of the brake system, such as antilock control, traction control or driving-stability control.

The brake system has the advantage, furthermore, that it has a simpler set-up than conventional brake systems. Vehicles with an electronic stability control function (ESP) require, for example, special ESP hydraulics which are more complicated than normal ABS hydraulics, since, in contrast to ABS hydraulics, they must also possess the capability for building up wheel brake pressures above the master cylinder pressure.

In vehicles with the brake system according to aspects of the invention, special ESP hydraulics are superfluous—the extraneous brake hydraulics according to aspects of the invention, in conjunction with a conventional ABS system, afford far better functioning. Fewer electromagnetically actuable valves are required than for conventional ESP hydraulics. Moreover, the brake system according to aspects of the invention has a better energy balance and a lower generation of noise than conventional ESP hydraulics, because the circulatory pumping, required there in the ESP operating mode, of brake fluid for the generation of dynamic pressure at a pressure-limiting valve is unnecessary. An improvement in the noise behavior, as compared with the prior art indicated, can also be achieved, since no noise-generating components, such as valves, motors or pumps, are arranged inside the module which is surrounded by the housing and which is connected in the vehicle to the splashboard which is critical in terms of structure-borne sound.

The set object of maintaining brake boosting in the event of a brief failure of the electrical energy supply is achieved in that only the (normal) operating mode presupposes the presence of electrical energy, whereas the relapse levels require only hydraulic or mechanical energy.

The invention claimed is:

1. A brake system for a motor vehicle comprising:
a master cylinder to which wheel brake cylinders are connectable;
a first piston which is coupled to a brake pedal via a push rod that transmits actuating forces;
a second piston which can be actuated by the first piston and which can be brought into force-transmitting connection to a third piston via which the master cylinder is actuated;
at least one elastic element which forms a pedal travel simulator which, in a brake-by-wire operating mode, gives a driver of the vehicle a pedal sensation;
means for coupling movements of the first piston and of the second piston, with the result that the pedal travel simulator is either switched on or switched off;
an interspace capable of being acted upon with hydraulic pressure, between the second piston and the third piston, wherein pressure upon the interspace loads the second piston and the third piston in opposite directions;
an electrically controllable pressure supply device which has a high-pressure source and which allows both a filling of the interspace with pressure medium and emptying thereof; and
a valve device that is configured to vary pressure that is fed in the interspace,
wherein the means for coupling the movements of the first piston and of the second piston comprise a further piston which can be acted upon by the hydraulic pressure provided by the pressure supply device, and
wherein the further piston restricts movement of the first piston in an event of an absent pressure supply and allows a movement of the first piston with the effect of the actuation of the pedal travel simulator when acted upon by the hydraulic pressure provided by the electrically controllable pressure supply device.

2. The brake system as claimed in claim 1, wherein the further piston is prestressed counter to a direction of actuation of the first piston by a compression spring.

3. The brake system as claimed in claim 2, wherein the further piston delimits a pressure space in the second piston, so that the supply of pressure medium into the pressure space causes a displacement of the further piston and a compression of the compression spring.

4. The brake system as claimed in claim 3, wherein the pressure space is connected to the high-pressure source.

5. The brake system as claimed in claim 4, wherein the compression spring is arranged in the pressure space.

6. The brake system as claimed in one of claim 2, wherein the further piston is an annular piston which is arranged coaxially to the first piston and the second piston.

7. The brake system as claimed in claim 6, wherein the annular piston is guided displaceably on a guide of the second piston.

8. The brake system as claimed in claim 1, wherein the valve device is a slide valve.

9. The brake system as claimed in claim 1, wherein a plurality of further pistons are provided, which are arranged in the second piston at regular angular intervals around an axis of symmetry of the second piston and which are acted upon in a direction of actuation by the hydraulic pressure provided by the pressure supply device.

10. The brake system as claimed in claim 9, wherein the further pistons cooperate with an annular force transmission disk which either prevents movement of the first piston or allows movement of the first piston with an effect of the actuation of the pedal travel simulator.

11. The brake system as claimed in claim 10, wherein the further pistons are prestressed counter to the direction of actuation of the first piston by a compression spring which is arranged inside the second piston and coaxially to the first piston.

12. The brake system as claimed in claim 1 further comprising a travel sensor for detecting a position and movement of the first piston, wherein an output signal from the travel sensor is fed to an electronic control unit to activate pressure-regulating valves.

13. The brake system as claimed in claim 1 further comprising a pressure sensor for detecting the hydraulic pressure discharged by the pressure supply device, wherein an output signal from the pressure sensor is fed to an electronic control unit.

14. The brake system as claimed in claim 1, wherein the pressure supply device contains a hydraulic high-pressure accumulator.

15. The brake system as claimed in claim 14, wherein the second piston contains an integrated high-pressure accumulator formed by at least one spring and at least one pressure space within the second piston.

16. The brake system as claimed in claim 1, wherein the pressure supply device contains electrically controllable pressure-regulating valves.

17. The brake system as claimed in claim 1, wherein an electronic control unit is assigned to the pressure supply device.

18. The brake system as claimed in claim 1, wherein an electronic control unit of the pressure supply device and an electronic control unit of a wheel brake pressure modulation module form a structural unit or are combined into a common control unit.

19. The brake system as claimed in claim 18, wherein the pressure supply device and the wheel brake pressure modulation module form a structural unit.

20. A brake system for a motor vehicle comprising:
a master cylinder to which wheel brake cylinders are connectable;
a first piston which is coupled to a brake pedal via a push rod that transmits actuating forces;
a second piston which can be actuated by the first piston and which can be brought into force-transmitting connection to a third piston via which the master cylinder is actuated;
at least one elastic element which forms a pedal travel simulator which, in a brake-by-wire operating mode, gives a driver of the vehicle a pedal sensation;
means for coupling movements of the first piston and of the second piston, with the result that the pedal travel simulator is either switched on or switched off;
an interspace capable of being acted upon with hydraulic pressure, between the second piston and the third piston, wherein pressure upon the interspace loads the second piston and the third piston in opposite directions;
an electrically controllable pressure supply device which has a high-pressure source and which allows both a filling of the interspace with pressure medium and emptying thereof; and
a valve device that is configured to vary pressure that is fed in the interspace,
wherein the means for coupling the movements of the first piston and of the second piston are automatically active in an event of an absent pressure supply and can be deactivated by the hydraulic pressure provided by the electrically controllable pressure supply device,
wherein the valve device is integrated in the second piston, and
wherein the valve device can be actuated mechanically by the first piston, and the valve device can be actuated electrohydraulically by a pilot control pressure that is regulated electronically by the pressure supply device.

* * * * *

UNITED STATES PATENT AND TRADEMARK OFFICE
CERTIFICATE OF CORRECTION

PATENT NO. : 8,449,047 B2
APPLICATION NO. : 12/595990
DATED : May 28, 2013
INVENTOR(S) : Drumm et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this
Eighth Day of September, 2015

Michelle K. Lee
*Director of the United States Patent and Trademark Office*